United States Patent Office 3,132,831
Patented May 12, 1964

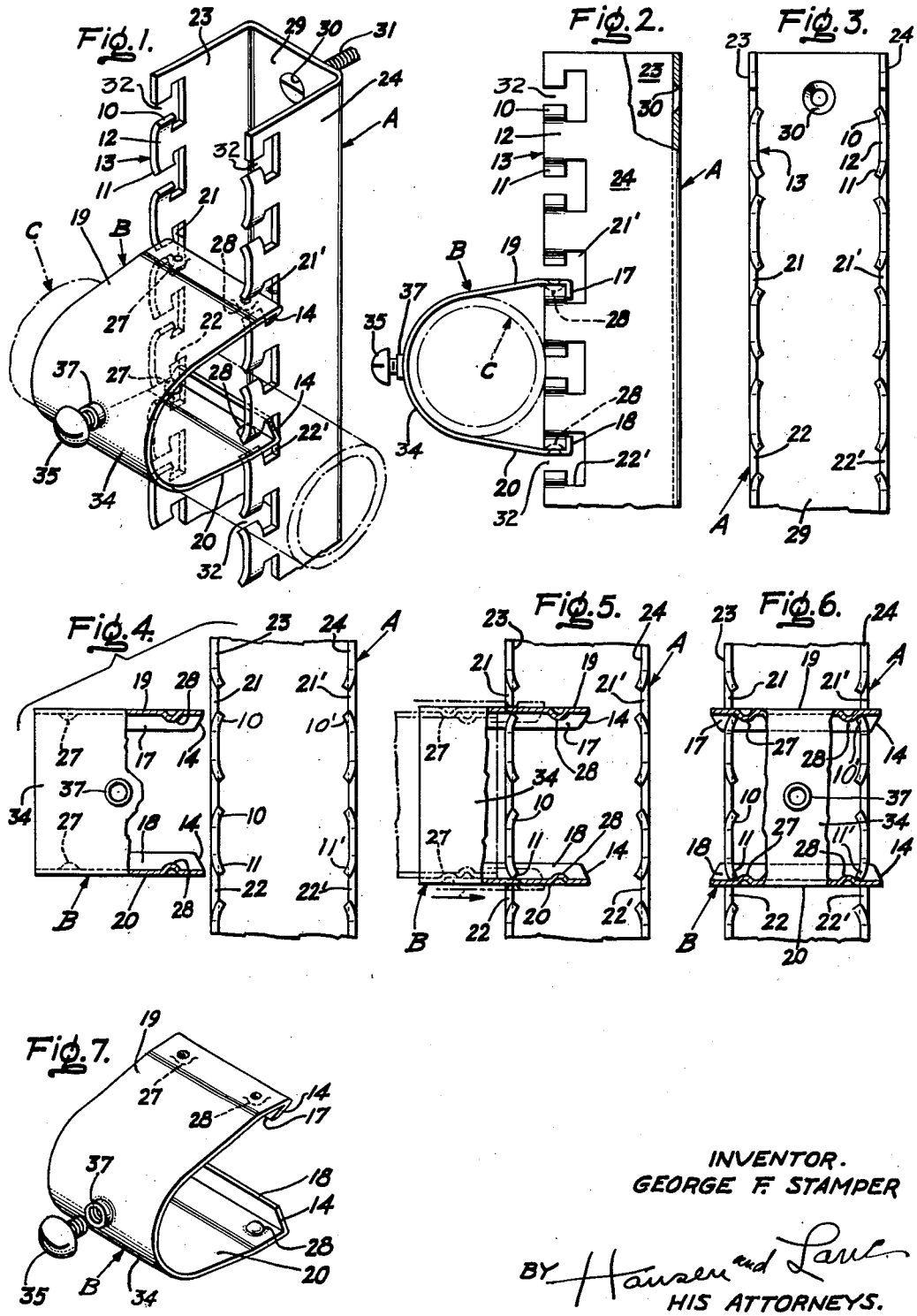

3,132,831
CLIP-ON PIPE HANGER
George F. Stamper, 3050 Mark Ave., Santa Clara, Calif.
Filed Nov. 5, 1962, Ser. No. 235,409
4 Claims. (Cl. 248—68)

The present invention relates to pipe hangers, and pertains more particularly to improvements in pipe hangers of the type disclosed in my Patent No. 3,042,352.

The invention provides an improved, wall mounted pipe hanger having a channel support member adapted to be fastened to a building wall or ceiling, the channel member having laterally opposite pairs of undercut notches in the free edges thereof. A U-shaped clip is adapted to be mounted over a pipe positioned transversely across the notched edges of the channel member, and the clip is provided with flanged side portions formed to enter, and interlockingly engage, a selected set of the undercut notches of the channel to secure the pipe in such position.

As used herein the term "pipe" etc. is intended to include conduit, tubing, rods, cables and other similarly shaped objects which the present hanger is obviously capable of supporting.

An object of the invention is to provide, in a pipe supporting channel having undercut notches along the free edges of the side flanges thereof, a cam portion adjacent each of the notches for spreading the side portions of a cooperating U-clip and guiding them into the notches.

A further object of the invention is to provide improved anchoring means on the portions of a pipe supporting U-clip to retain the clip in properly centered relation when seated in pipe supporting condition in a selected set of notches in a channel.

A further object of the invention is to provide an improved pipe hanger of the type disclosed in Patent No. 3,042,352.

These, and other objects and advantages of the invention, will be apparent from the following description and the accompanying drawings, wherein:

FIG. 1 is a perspective view of a fragment of a pipe supporting channel adapted to be mounted on a building wall or ceiling, a pipe retaining U-clip being mounted thereon, and a short portion of pipe supported thereby being shown in broken lines.

FIG. 2 is a side elevational view of the structure shown in FIG. 1, a portion of the channel being broken away.

FIG. 3 is a top, plan view of the channel shown in FIGS. 1 and 2.

FIG. 4 is a top, plan view of a fragment of channel, with a pipe retaining U-clip laterally adjacent thereto and positioned for endwise movement into a selected pair of undercut notches in the side flanges of the channel, a portion of the U-clip being broken away.

FIG. 5 is a view similar to FIG. 4, the dash-one-dot lines showing the U-clip as it is first presented to a side of the channel, the dash-two-dot lines showing the position of the U-clip as the embossments in the side portions thereof ride over the inner sides of the notches in which they are inserted, and the solid lines showing the U-clip inserted approximately half its length into the notches, a portion of the U-clip being broken away.

FIG. 6 is a view similar to FIGS. 4 and 5 with the U-clip fully inserted in the notches, and in interlocked engagement with the channel side flanges, portions of the U-clip being broken away.

FIG. 7 is a perspective view of the U-clip shown in FIGS. 1, 2 and 4–6 as it appears separately from the channel member.

Briefly, in the illustrated embodiment of the invention, a channel member A has a plurality of undercut notches provided in the free edges of both flanges thereof. Both end portions 10 and 11 of the head portion 12 of each of the T-shaped, internotch portions 13 in the side flanges of the channel A are bent inwardly to exert a separating, cam action on the side portions 19 and 20 of a U-shaped, pipe retaining U-clip B when the latter is forced endwise into the notches as shown in FIGS. 4–6.

The U-clip side portions 19 and 20 are normally spaced apart by a distance slightly less than the spacing between any selected set of notches, for example, the notches 21, 21' and 22, 22' (FIGS. 1, 2 and 4–6) into which said clip side portions are adapted to be inserted. In the final, seated position of the U-clip shown in FIG. 6, a pair of inward embossments 27 and 28, provided on each side portion of the U-clip B, engage the ends of the inwardly bent T-tabs 10 and 11 on both channel flanges and thus resist endwise displacement of the U-clip.

Referring to the drawings in greater detail, each pipe supporting channel A comprises a web portion 29 having suitable mounting means, such as a plurality of screws 31 inserted in holes provided therefor in the channel web 29, to secure the channel A to a wall or ceiling along which one or more pipes C are to be hung.

Each side flange 23 and 24 of each channel A is provided with a plurality of undercut notches, such as the notches 21, 21' and 22, 22' along the free edge thereof. The notches in each channel side flange are laterally opposite those in the other, thereby providing aligned pairs thereof. Additionally, the notches are spaced apart lengthwise of the channel so that selected sets of the notches, for example the notches 21, 21' and 22, 22', are spaced apart lengthwise of the channel by a distance slightly greater than that normally separating the flanged terminal ends of the side portions 19 and 20 of a U-clip B to be inserted therein.

Each channel A is of strong, rigid material, for example steel, the size and strength of which may be determined by conventional calculations to support, with an adequate safety factor, the maximum diameter and weight of pipe for which it is intended. Such calculations are well within the routine capabilities of any mechanical engineer conversant with the principles of design and strength of materials, and will vary for different maximum sizes and weights of pipe to be supported. It is preferred, however, in order to facilitate handling and installation of the invention, to make the channels and clips as light as practicable.

The undercut notches in the two channel side flanges 23 and 24 are substantially identical. Each notch comprises an entry portion 32 in the free edge of its channel flange, with the lower portion of the notch under-cut on both sides so as to leave the T-shaped portion 13 of flange material between adjacent notches. Each T-shaped portion 13 comprises a stem portion 33, and head portion 12. The tab end portions 10 and 11 of each head portion 12, which extend laterally beyond the stem portion 33, are bent inwardly toward the center of the channel at a sufficient angle so that the outer surface of each such inwardly bent tab portion forms a sloping, cam surface to cam apart the side portions 19 and 20 of a U-clip B when said side portions are presented thereto and are moved endwise thereagainst as illustrated in FIG. 5.

The arcuate portion 34 interconnecting the side portions 19 and 20 of each U-clip B is of a circumference to seat over a pipe C of maximum diameter for which the U-clip is intended. The side portions 19 and 20 of each U-clip are of such length, that when the clip is saddled over a pipe C of known maximum external diameter, that the flanges 17 and 18 on the free ends of the U-clip side portions 19 and 20 will lie closely beneath the laterally extending head tab portions 10 and 11 of the T-shaped, internotch portions 13 of a selected set of notches into which the U-clip is to be mounted. The U-clips B preferably are made of mild spring metal, so that the side portions thereof may be sprung laterally apart onto a pipe C in order to enter a required set of channel notches without permanently distorting the U-clip.

In using the present invention, a pipe C to be hung on a channel A, as shown in FIGS. 1 and 2, is first mounted transversely thereacross in approximately the position in which it is to be secured. A U-clip B of proper size to fit thereon is then sprung laterally onto the pipe at one side of the channel A, as shown in FIG. 4.

The thus assembled pipe C and U-clip B may then be moved lengthwise of the channel A any slight distance required to substantially align the flanged side portions 19 and 20 of the U-clip B with a selected set of notches, such as the notches 21, 21' and 22, 22', into which they are to be inserted. The U-clip B is then moved endwise along the pipe C, past its dot-dash and solid line position of FIG. 5, and into its final, seated position of FIG. 6.

As the clip is moved to the right, just beyond its dot-dash line position of FIG. 5, the leading ends of the U-clip side portions 19 and 20 engage the cammed outer faces of the inwardly bent head tabs 10 and 11 of the T-shaped inter-notch portions 13 inwardly adjacent the selected notches 21 and 22 into which the side flanges are to be inserted. Since the outer ends of these tab portions, as mentioned previously herein, are spaced apart by a distance slightly greater than the normal, unsprung distance between the ends of the U-clip side portions, sufficient endwise force is applied to the U-clip to cam the clip side portions apart the required distance, and to force them into their respective notches 21 and 22.

As the U-clip B is advanced to its dash-two-dot position of FIG. 5, the inward embossments 27 and 28 of the U-clip side portions are similarly cammed over the inwardly bent T-tabs 10 and 11, while a still further camming action occurs as the U-clip side portions 19 and 20 encounter the sloping ends of the inwardly bent T-tabs 10' and 11' on the farther channel flange 24.

The inwardly bent flanges 17 and 18 on the free ends of the clip side portions preferably are of approximately the same width as the laterally extending T-tabs 10 and 11 of the inter-notch flange portions 13 beneath which they are seated when in their final position of FIG. 6. To avoid having the ends of these U-clip side flanges hang up in the event that they should engage the stem portion 33 of a T-shaped inter-notch portion 13, the ends 14 of these flanges are beveled inwardly. Such beveling of the flange ends causes the flanges to be cammed apart to clear the stem 33 of any T-shaped inter-notch portion 13 which they may encounter while being moved endwise from their position of FIG. 4 to that of FIG. 6.

The embossments 27 and 28 of each U-clip side portion in which they are formed preferably are spaced apart by the same distance as that separating the inwardly bent T-tabs 10 and 11 of a laterally opposite pair of notches, for example, the notches 21 and 21'. This spacing of the embossments insures that they will seat securely against the T-tabs of both channel flanges when the U-clip is in its final, seated position of FIG. 6.

A pipe clamp screw 35 may be screwed into an internally threaded flange 37 provided therefor centrally of the arcuate portion 34 of the U-clip B. This screw may be used to force a pipe C into firm contact with the flanges of the channel A, while at the same time exerting an outward thrust on the U-clip. This arrangement is useful where a small pipe is to be mounted, and also avoids rattling in the event that a pipe is to be mounted in a position where the installation may be subject to vibration.

The invention provides an improved pipe hanger having all the advantages of that shown in my prior Patent No. 3,042,352, but, by reason of the improvements embodied herein, the mounting of the pipe, and the seating of the U-clip is greatly facilitated and speeded up. This not only saves time in installation, but makes the pipe hanger more desirable to the installers. It also avoids difficulties which otherwise might be experienced in forcing the U-clip home to its final, seated position, and insures that the U-clip will be secure against endwise displacement when in the position shown in FIG. 6.

These important improvements are provided at no increase in cost, since the bending of the T-tabs 10 and 11 of the inter-notch portions 13 can be accomplished simultaneously, and in the same operation, as the punching of the undercut notches in the channel flanges 23 and 24, while the beveling of the ends of the flanges 17 and 18 of the U-clip, and the provision of the anchoring embossments 27 and 28, may be accomplished by the same dies which blank and form the U-clip B, and without any additional operations.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims:

1. In a pipe hanger including a channel member having undercut notches along each free edge thereof, and means for mounting the channel member along a building wall or ceiling with the notched, free edges of the channel member facing outwardly, and an arched, pipe-embracing, U-shaped clip of a size to overlie and embrace a pipe of selected diameter when such pipe is mounted transversely across the free edges of said channel member between two selected notches in a free edge thereof, the side portions of such clip being of a length to extend into such notches, each side portion of said clip having a laterally extending flange on the free end thereof of a size and so located as to extend into the undercut portions of such notches; a cam surface formed on each side of each channel notch by bending angularly inwardly toward the other flange the portion of each flange of the channel located between the undercut portion of each notch and the free edge of the channel outwardly thereof, each of said cam surfaces being disposed at an angle to the remainder of the channel flange from which it is formed to engage and guide a side portion of such clip into the notch with which said cam surface is associated when such clip side portion is slightly misaligned with said notch.

2. An arrangement according to claim 1 wherein the end face of each angularly bent flange portion is disposed at substantially right angles to the outward cam surface thereof, whereby each such end surface is disposed at an angle to guide into the notch adjacent thereto a side portion of such clip inserted endwise into the notch in the other flange opposite thereto.

3. An arrangement according to claim 1 wherein a side portion of each clip is provided with an outward embossment on the end flange thereof, said embossment being positioned for cam engagement with the inwardly bent flange portion adjacent a notch in one of the channel flanges when such flange is entering one of said notches endwise, thereby to resist endwise displacement of such flange from such notch when such flange is inserted therein.

4. In a pipe hanger including a channel member having undercut notches along each free edge thereof, and means for mounting the channel member along a building wall or ceiling with the notched, free edges of the channel member facing outwardly, and an arched, pipe-embracing U-shaped clip of a size to overlie and embrace a pipe of selected diameter when such pipe is mounted transversely across the free edges of said channel member between two selected notches in a free edge thereof, the side portions of such clip being of a length to extend into such notches, each side portion of said clip having a laterally extending flange on the free end thereof of a size and so located as to extend into the undercut portions of such notches; a cam surface formed on each side of each channel notch by bending angularly inwardly toward the other flange the portion of each flange of the channel located between the undercut portion of each notch and the free edge of the channel outwardly thereof, each of said cam surface being disposed at an angle to the remainder of the channel flange from which it is formed to engage and guide a side portion of such clip into the notch with which said cam surface is associated when such clip side portion is slightly misaligned with such notch, and a pair of outward embossments on a side portion of each clip in position to engage the free end of the inturned flange portion engaged by such clip side portion for guiding the latter into the notch adjacent such inturned flange portion, the embossments of each pair thereof being spaced apart by a distance slightly less than the spacing between laterally opposite inturned portions on opposite flanges of such channel member for resisting endwise displacement of the clip from a fully inserted position.

References Cited in the file of this patent
UNITED STATES PATENTS

| | | |
|---|---|---|
| 1,452,993 | Wack | Apr. 24, 1923 |
| 2,938,692 | Bosworth et al. | May 31, 1960 |
| 3,042,352 | Stamper | July 3, 1962 |